United States Patent [19]

Kaun et al.

[11] 4,306,004

[45] Dec. 15, 1981

[54] ELECTRODE FOR ELECTROCHEMICAL CELL

[75] Inventors: Thomas D. Kaun, New Lenox; Paul A. Nelson, Wheaton; William E. Miller, Naperville, all of Ill.

[73] Assignee: The United States of America as represented by the United States Department of Energy, Washington, D.C.

[21] Appl. No.: 148,312

[22] Filed: May 9, 1980

[51] Int. Cl.³ .................. H01M 2/16; H01M 2/18
[52] U.S. Cl. ............................ 429/112; 429/136; 429/211; 264/104
[58] Field of Search .............. 429/239, 233, 136, 112, 429/211

[56] References Cited

U.S. PATENT DOCUMENTS

| | | | |
|---|---|---|---|
| 585,853 | 7/1897 | Samuels | 429/136 |
| 4,011,374 | 3/1977 | Kaun | 429/220 |
| 4,029,860 | 6/1977 | Vissers | 429/122 |
| 4,086,396 | 4/1978 | Mathers et al. | 429/103 |
| 4,087,905 | 5/1978 | Cooper et al. | 429/133 |
| 4,110,517 | 8/1978 | Arntzen | 429/133 |

*Primary Examiner*—Donald L. Walton
*Attorney, Agent, or Firm*—Hugh W. Glenn; Robert J. Fisher; Richard G. Besha

[57] ABSTRACT

An electrode structure for a secondary electrochemical cell includes an outer enclosure defining a compartment containing electrochemical active material. The enclosure includes a rigid electrically conductive metal sheet with perforated openings over major side surfaces. The enclosure can be assembled as first and second trays each with a rigid sheet of perforated electrically conductive metal at major side surfaces and normally extending flanges at parametric margins. The trays can be pressed together with moldable active material between the two to form an expandable electrode. A plurality of positive and negative electrodes thus formed are arranged in an alternating array with porous frangible interelectrode separators within the housing of the secondary electrochemical cell.

9 Claims, 6 Drawing Figures

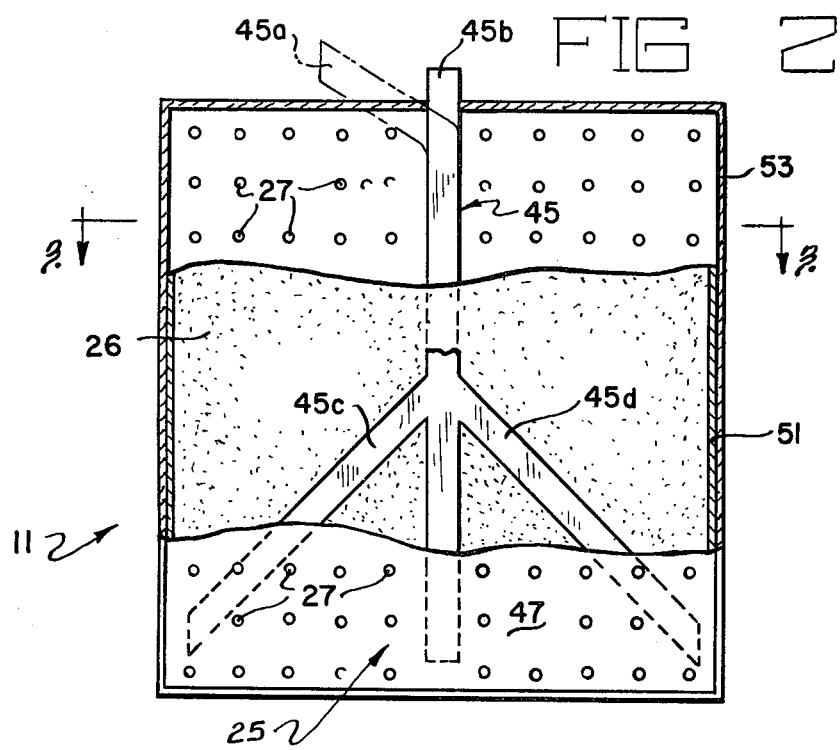
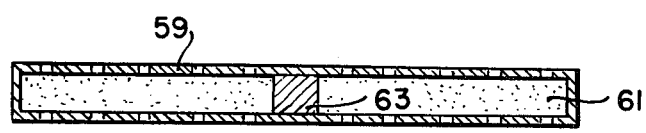
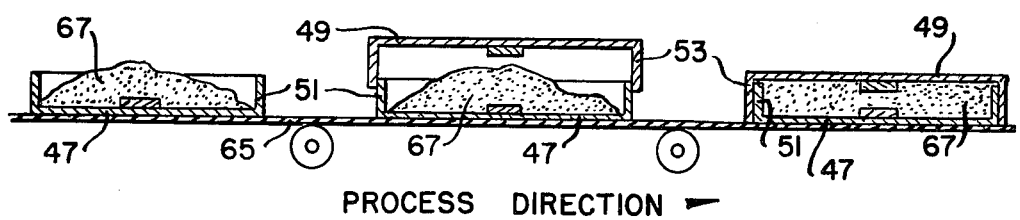

ELECTRODE FOR ELECTROCHEMICAL CELL

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates to the design of electrodes in secondary electrochemical cells. It is particularly applicable to cells that operate at high temperatures with molten salt electrolyte and include corrosion resistant, high temperature ceramic materials such as boron nitride, yttria, silicon nitride, aluminium nitride, calicum zirconate and magnesium oxide as cell separator materials. These materials, particularly boron nitride are quite frangible in felt, foam or compacted powder forms such that they are easily crushed, crumbled or punctured during cell operation or assembly. In previous cell designs, this material has been supported by the electrode structure often including screens or cloths disposed at electrode surfaces. The screen or cloth has the additional purpose of retaining particles of electrochemically active material within the electrodes. In order to achieve particle retention, fine mesh of e.g. 200-325 U.S. standard mesh have been selected but such screens or cloths with fine strands have been subject to ruptures followed by cell shorting due to bridging of electrode materials or stray screen wires.

Although various secondary electrochemical cells may advantageously incorporate the teachings of the present invention, those particularly contemplated include solid electrochemically active material such as alloys of alkali metals or alkaline earth metals in the negative electrode and solid transition metal chalcogenides such as iron sulfides, cobalt sulfides, nickel sulfides, etc., in the positive electrode. Cells of these types can include molten salt electrolytes such as alkali metal halides and alkaline earth metal halides or mixtures of these materials. Such cell materials are well known and are described in various patents and publications relating to this subject matter.

The following patents illustrate the general field of this development.

Arntzen, U.S. Pat. No. 4,110,517, discloses an electrochemical cell employing frangible forms of boron nitride and other ceramic materials as an electrically insulative cell separator.

Vissers et al, U.S. Pat. No. 4,029,860, describes a compartmented or honeycombed structure used as a current collector and to support electrochemically active material within the electrode of an electrochemical cell.

Kaun, U.S. Pat. No. 4,011,374, describes the use of a thermosetting resin as a moldable material into which electrochemically active material is blended for preparing electrodes.

Cooper et al, U.S. Pat. No. 4,087,905 and Mathers et al, U.S. Pat. No. 4,086,396 disclose an electrochemical cell including a layer of powdered electrically insulative material between electrodes of opposite polarity.

SUMMARY OF THE INVENTION

Therefore, in view of the above it is an object of the present invention to provide an improved electrode structure for secondary electrochemical cells in which the electrodes are separated by frangible electrically insulative ceramic materials.

It is a further object to provide such an electrode structure in which the functions of current collection, active material containment and interelectrode separator support can be incorporated into a common member.

It is also an object to provide an electrode structure capable of expanding and contracting during cell cycling.

It is a further object to provide an electrode structure with improved electrical contact between electrochemically active material and current collector members.

It is also an object to provide an improved electrode having current collector members positioned to shunt out at least a portion of the resistance contributed by the electrochemically active material and thereby reduce cell resistance to charge and discharge current.

It is a further object to provide an electrode preparation method which is adaptable for continuous operation in an uncomplicated procedure for assembling moldable electrochemically active material within a rigid external structure.

It is a still further object to provide an electrochemical cell design that includes frangible interelectrode separators having secure support by the adjacent electrodes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, an electrode structure for a secondary electrochemical cell includes a rigid enclosure of electrically conductive metal sheet having perforated openings over its major surfaces defining a compartment containing solid electrochemically active material.

In more specific aspects of the invention, an electrode structure includes first and second oppositely facing trays, each tray including a rigid flat sheet of perforated electrically conductive metal corresponding to a major surface of the electrode structure. The trays have flanges extending laterally from parametric margins to define an open sided compartment with an elongated electrical conductor bonded to the internal major surface of the tray. The trays are sized such that their flanges slideably engage corresponding flanges of the oppositely facing tray on assembly to define a closed compartment between the trays for containing electrochemically active material.

In one other aspect, the rigid sheets contain perforation of about 150-1200 micrometers uniformly spaced over substantially all of the major surfaces thereof to provide an open area of about 30-50% in the major side surface of the electrode.

In other aspects of the invention, inwardly protrusions of electrically conductive material are provided at the internal surface of the perforated sheet for contacting solid electrochemically active material. For instance, elongated conductors or strips of electrically conductive material can be attached to the internal surface of the rigid perforated sheets to provide these protrusions.

The present invention also comprehends a method of preparing an electrode for use in a secondary electrochemical cell including positioning a first tray having a rigid flat perforated sheet of electrically conductive material with parametric flanges defining an open sided tray on a supported surface. A moldable medium containing electrochemically active material is added into the tray compartment. A second similar tray is assembled over the first tray and the moldable medium in opposite facing alignment such that the flanges of the respective trays slideably engaged to define a closed comaprtment containing the moldable medium. The tray are pressed together to shape the medium into the shape of the closed compartment.

BRIEF DESCRIPTION OF THE DRAWINGS

The present invention is illustrated in their accompanying drawings wherein

FIG. 2 is an elevation view of an electrode.

FIG. 4 is an alternate cross-section of an electrode.

FIG. 5 is a schematic illustration of a method of preparing electrodes.

DETAILED DESCRIPTION OF THE PREFERRED EMBODIMENT

Figure 1:
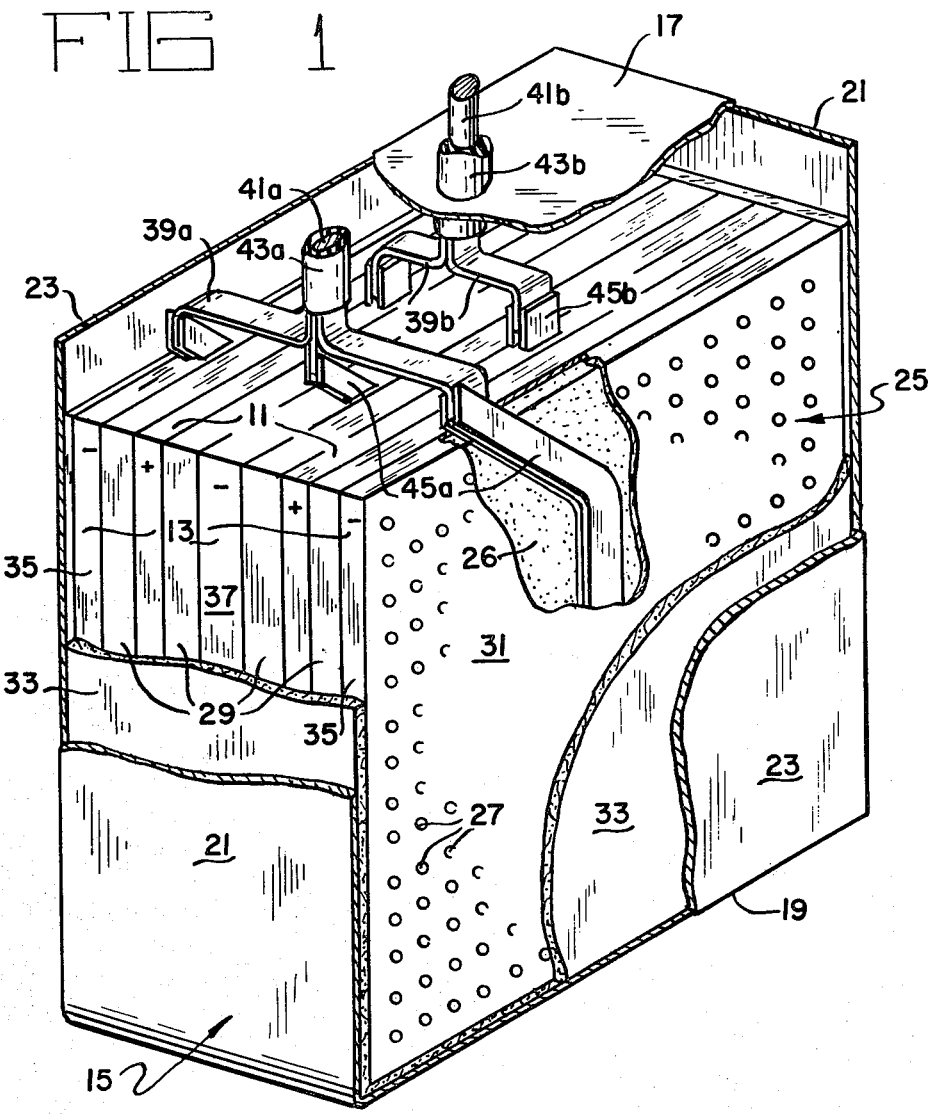
FIG. 1 is a perspective view of an electrochemical cell.

In FIG. 1 a secondary electrochemical cell is illustrated including a plurality of positive 11 and negative 13 electrodes of plate-like shape contained within a prismatic housing 15. The housing is illustrated of rectilinear prismatic shape to contain the rectilinear plate-like electrodes, however, it will be understood that various other cylindrical or prismatic shapes can be employed in a consistent manner for the containment of electrodes.

The cell housing 15 as illustrated includes top 17 and bottom 19 walls, at least two end walls 21 and at least two side walls 23 to define an internal cell volume for containing the plurality of positive and negative electrodes.

The electrodes are aligned as illustrated in an alternating array of positive 11 and negative 13 electrodes along the cumulative thickness of their edge surfaces, i.e. minor electrode surfaces facing the end walls 21, the top wall 17 and the bottom wall 19 of the cell housing 15. Electrodes of opposite polarity are electrically separated by layers 29 of frangible porous electrically insulative material facing their major side surfaces within the array.

The electrodes 11, 13 (FIGS. 1 and 2) include an outer enclosure 25 of rigid electrically conductive material. The outer walls of enclosure 25 at least at the major side surfaces 31 of each electrode include openings 27 but with sufficient rigid material remaining to provide firm support for the layers of frangible electrically insulative material 29 separating the electrodes.

The electrochemically active material 26 in enclosure 25 of the individual electrodes can be of any suitable type to provide alternate positive 11 and negative 13 electrodes in the electrode array. Solid alloys of alkali metals or alloys of alkaline earth metals containing alloying materials of aluminum, silicon, magnesium and combinations thereof are contemplated for the negative electrodes. The positive electrodes can contain chalcogenides or preferably solid transition metal chalcogenides as electrochemically active material. Both the positive and the negative electrodes can include electrolyte such as mixtures of alkali metal halides, mixtures of alkaline earth metal halides, or combined mixtures of these halides. Cells containing these type active materials and electrolytes are well known and described in the above cited patents as well as other publications within the literature.

The active material 26 contained within the electrode can be in various forms. It can comprise a mixture or paste of particulate electrochemically active material, electrically conductive current collector particles and particulate or molten electrolyte depending on temperature. Prepressed solid plaques of particulate active material and electrolyte is another suitable electrode form. In other electrodes, the active material can be bonded within a porous carbon matrix of thermosetting material prepared in a manner as described in U.S. Pat. No. 4,011,374 cited above.

In a preferred construction of the electrochemical cell, the alternating array of electrodes are separated and electrically insulated from the cell housing 15, at least at the housing end walls 21 and bottom wall 19 by a U-shaped continuous or segmented sheet or sheets of electrically insulated material 33. Additional layers of material 33 may be disposed between side surfaces 23 and the end electrodes 35. Electrically insulative material 33 may be the same as sheets 29 disposed intermediate electrodes of opposite polarity or preferably of a tougher less porous material for sturdily prohibiting contact between edge surfaces of the electrodes and the cell housing.

In this preferred embodiment illustrated in FIG. 1, the end electrodes 35 in the alternating array of electrodes are of like polarity. This configuration minimizes the harmful consequences of insulation failure between end electrodes 35 and side walls 23 of the housing. In some cell applications the electrically insulative material 33 may be omitted at side walls 23 and the cell housing maintained at the polarity of the end electrodes 35.

In the illustrated alternating array of electrodes, the center electrode 37 is of like polarity with that of end electrodes 35. Electrode 37 is of greater thickness than each individual end electrode to accommodate the active material within the two electrodes 11 of opposite polarity facing its two major side surfaces. In the FIG. 1 electrode array, three negative and two positive electrodes are illustrated with the center and end electrodes of negative polarity. It will be understood that any reasonable odd number of electrodes can be provided. Also the polarity of the electrodes within an array may be reversed throughout the array provided the end electrodes are of like polarity and the centrally disposed electrodes having the same polarity as the end electrodes are of increased thickness to that of an individual end electrode.

Electrodes of like polarity are interconnected by one of two bus bars 39a and 39b electrically coupled to cell terminals 41a and 41b respectively of opposite polarity. Terminals 41a and 41b extend through and are electrically insulated from the top wall 17 of housing 15 by electrically insulative feedthroughs 43a and 43b. Electrical bus bars 39a and 39b are spaced lengthwise from one another within the cell housing and are each connected to individual electrodes by electrical conductors 45a and 45b. Conductors 45a illustrated as angling from the electrodes of one polarity to permit lengthwise separation of the bus bars.

Figure 3:
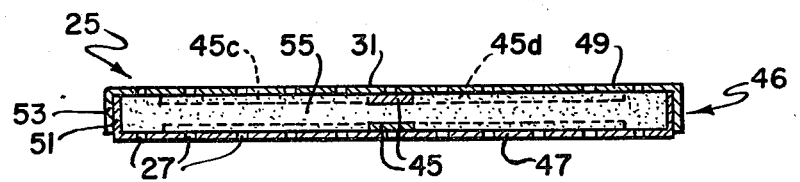
FIG. 3 is a cross-sectional view of the electrode of FIG. 2.

FIGS. 2 and 3 illustrate a preferred electrode structure for use in the electrochemical cell described above. The structure includes an outer enclosure 25 of rigid electrically conductive trays having openings 27 at least over the major side surfaces of the electrode. Openings 27 may be provided by perforating, etching, expanding or other suitable process to the rigid trays.

Each electrode enclosure 25 is preferably constructed of two oppositely facing trays 47 and 49 with each tray including a flat sheet at its major side surface and laterally extending flanges 51, 53 at the perimertric edge surfaces of the electrode. The two trays are disposed with their flanges in oppositely facing alignment such that they slideably engage to enclose a central and expandable electrode compartment 55 for containing active electrode material. The oppositely facing trays of the electrode can be slideablly fitted together by making tray 47 slightly smaller than tray 49 such that the flanges 51 of the smaller tray slideably fit within the open compartment of the larger tray. The trays are provided of an electrically conductive metal alloy or other material compatible with the cell environment. For example steel alloys and nickel alloys are contemplated for the transition metal calcognide-molten salt-alkali metal alloy cells. The trays at their major side surfaces 31 are of sufficient thickness and rigidity to provide firm and secure support for the frangible porous electrically insulative separators 29 disposed between the electrodes in the electrochemical cell. For example, a 1008 carbon steel sheet of about 150 square centimeters cross-section area would typically include a thickness of about 0.025 centimeter. Sheet materials of different cross-section area and rigidity may include greater or lesser thickness.

Trays 47 and 49 also include openings 27 of sufficiently large area to permit ion migration and an electrolyte flow. However, sufficient metal must remain in the major tray surfaces to provide electrical current collection and to provide rigid firm support for the frangible interelectrode separators. As an example sheets with about 30-50% open area are contemplated as suitable for this purpose.

The internal surface of each tray is provided with an attached electrical conductor 45 that is shonw extending from top to bottom of the electrode. The lower portion of conductor 45 is illustrated with branches 45c and 45d angling from the conductor trunk portion to provide additional rigidity to the side surfaces and protrusions into contact with the electrochemically active material. The upper portion of electrical conductor 45 can include the alternate configurations illustrated as 45a and 45b for electrodes of opposite polarity. The upper portion at 45a is angled while that at 45b is straight such that the corresponding conductors 45a or 45b of alternate electrodes of like polarity can be electrically coupled into common bus bars illustrated at 39a or 39b in FIG. 1. Electrical conductors 45 can be provided in laminated form as a bundle of strips particularly at upper portions 45a and 45b to form a flexible connection between the conductor and bus bars to accommodate small shifts as the cell operates.

In order to enhance electrical contact between the perforated electrically conductive trays and the electrochemically active material, inwardly extending protrusions can be provided from the internal surfaces of the trays. The trunk and branch portions of conductor 45 illustrated in FIG. 2 are one example of such protrusions that contact and extend into the electrochemically active material to enhance facial rigidity and conductance within the electrode. Various other generally normally extending inward protrusions may also be provided by forming or affixing inwardly extending flanges, plates, strips, knobs or other protrusions on the internal surfaces of the perforated trays.

FIG. 4 illustrates an alternate electrode cross-section in which a ring 59 of perforated metal sheet in rectangular or other form encloses the electrochemically active material 61 to serve as an electrode within the cell. An electrical conductor 63 is illustrated extending through the electrode center along the internal surfaces of the preforated rectangular ring. This alternate electrode structure can be more rigid but with some loss of the expandability offered by the FIG. 3 embodiment.

The porous electrically insulative separator materials are preferably a felt or powder of ceramic material. Boron nitride felt prepared of intertangled fibers has been found to be particularly well suited for lithium alloy-transition metal chalogenides cells. Compacted magnesia powder is also contemplated as a suitable material for an interelectrode separator. Other felts or powder that may be employed include those of yttria, magnesia, zirconia, aluminum nitride, silicon nitride or combinations of these materials. The inventors have found by firmly and rigidly supporting felts or powders of this type adjacent to and between rigid perforated metal sheets, that the perforations in the metal sheets can be made even larger than the average particle sizes of the electrochemically active material within the individual electrodes. In such an arrangement, the ceramic felt or powder sufficiently occludes the perforations of the metal sheets to block migration of electrochemically active particles without impeding flow of molten or liquid electrolyte during cycling of the electrode. Another approach involves adding a thin mesh for particle retention on the internal tray surfaces.

The various electrodes and cells have been illustrated generally with rectilinear shapes. However, the present invention contemplates the use of various other shapes and cross-sections for the individual electrodes and the assembled cell. For example, a central cylindrical electrode within a tubular enclosure of perforated metal sheet can be surrounded by a plurality of annular electrodes forming an alternating concentric array of positive and negative electrodes. Each electrode has concentric tubes of perforated metal as its outer walls. As in the rectilinear prismatic cell illustrated in FIG. 1, each of the electrodes are separated from electrodes of opposite polarity by porous annular electrically insulative members. In this cylindrical cell these members are tubular layers of the frangible ceramic felt or powder described above. Due to the structural strength of these concentric tubular electrodes supporting the frangible insulative material, additional stability may be imparted to the frangible interelectrode separators.

In one manner of assembling the electrochemical cell of FIG 1, an alternating array of positive 11 and negative 13 electrodes with interelectrode separators 29 is assembled within an U-shape sheet of electrically insulative material 33 outside the cell housing 15. An outer shim metal layer (not shown) can be incorporated on the outside of the insulative material to impart support. Additional sheets of material 33 can be placed on the outside surfaces 31 of the end electrodes 35. The entire assembly can then be slid through the top opening of the cell housing with top wall 17 removed. Top wall 17 can then be suitably sealed or otherwise attached as a lid on the cell housing. Sufficient electrolyte can be incorporated into the array prior to assembly to serve the cell during operation. For example, each electrode can contain particles of fusible electrolytic salt and the interelectrode separators can be previously permeated with electrolyte. A more detailed method of cell assembly is described in the Assignee's copending patent application Ser. No. 148,325 filed May 9, 1980 to Kaun and Eshman entitled Electrochemical Cell Method.

A preferred method for preparing the electrodes of the present invention is illustrated in FIG. 5 where three electrodes in different stages of preparation are presented. A first tray 47 is positioned with its flange portions 51 extending upwardly to define an open sided compartment on a flat support surface 65. As illustrated in the previous drawings, the flanges extend from the complete perimeter of the electrode tray 47. Electrochemically active material in a moldable form 67 is disposed in a measured amount into the open sided tray compartment. A second tray 49 including outwardly extending flanges 53 that define a slightly larger perimeter than that of flanges 51 is positioned over tray 47 in slideable oppositely facing engagement. Tray 49 is then pressed downwardly against tray 47 until flanges 53 substantially overlap flanges 51 and the electrode material is molded to substantially fill the internal compartment of the electrode. This pressing operation may be performed by rolling, flat pressing in stage or continuous steps or by other techniques within the skill of the art.

The electrode material selected for this process can be of any suitable material as discussed above containing the appropriate electrochemically active components for the positive or negative electrodes. A moldable material can be prepared by forming a paste such as alkali metal halides as electrolyte with an electrochemically active material such as a transition metal chalcogenides. One particularly suitable moldable medium includes a thermosetting resin and a solid volatile in mixture wiht the electrochemically active material. After the oppositely facing trays are pressed together to mold the electrode material into the shape of the compartment, the electrode can be heated to vaporize the solid volatile and cure the thermosetting resin to form a porous matrix containing the active material.

Examples of moldable material of such as a thermosetting resin in mixture with solid volatiles are given in the above cited U.S. Pat. No. 4,011,374, which is incorporated by reference for this purpose. Various thermosetting materials such as the phenolic, epoxy or furfuryl resins in the form of monomers, partially polymerized liquids or paste can be blended into mixture with the solid volatiles. Volatiles such as carbonates, bicarbonates and other organic compounds such as alkali metal amides and hexochlroethane can be used. On subsequent heating of such mixtures within the enclosed cell compartment, the volatiles transform to gases and the thermosetting materials polymerize or even carbonized to form a rigid porous matrix containing the electrochemically active material.

Figure 6:
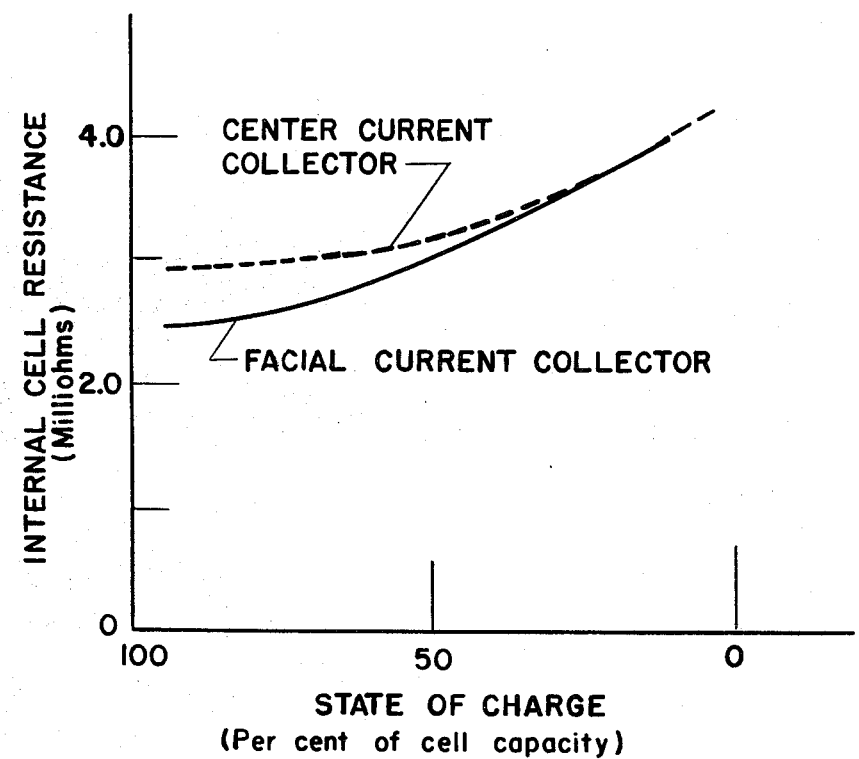
FIG. 6 is a graph of state of charge vs. cell resistance for a conventional cell and one using the present electrode.

FIG. 6 is presented to illustrate the reduction in cell resistance that can be obtained by use of a perforated steel enclosure as an electrode current collector. The graph of this Figure compares cell resistance at different charge states for two cells of about the same size and capacity. Each cell included two negative electrodes containing lithium-aluminum alloy, a central positive electrode containing FeS and an electrolyte of LiCl and KCl mixtures. Boron nitride felt layers were placed between the electrodes of opposite polarity. In the standard cell a central steel sheet served as current collector in the positive electrode, for example, as is described and illustrated in U.S. Pat. No. 4,110,517 cited above. In the other cell employing the improvements of the present invention, the positive electrode included a facial current collector of external perforated sheets with about 35% open area and of about the same weight as that of the current collector in the positive electrode of the standard cell. It is clear from FIG. 6 that a substantial reduction in cell resistance at full charge to about 50% charge results from use of the facial sheets of perforated metal as current collector. This reduction in resistance is expected to impart an increased specific power to the cell.

It will be clear that the present invention provides an improved electrode structure that combines the functions of current collection, active material containment and interelectrode separator support into a single structure for electrode containment. The positioning of the electrically conductive current collector on the outside of the electrode shunts interelectrode current around the active material in contrast to prior electrodes having centrally disposed current collectors. The rigid facial sheets also provide firm support to frangible interelectrode separators that might otherwise crumble during assembly or operation of the cells. By employing two oppositely facing trays of rigid perforated sheet in slideable engagement to define an internal electrode compartment an expandable electrode structure is formed to accommodate the expansion and migration of electrode materials during cell cycling. Even though the electrodes are shown filling or nearly filling the electrochemical cell compartment housing it will be understood that the expansion of cells of one polarity will be at least partially offset by the contraction of cells of the other polarity. Also, the compaction and expansion of porous ceramic material employed as interelectrode separators can accommodate a portion of electrode volume changes.

The present invention also provides a method of preparing an electrode for use in a secondary electrochemical cell in a manner that will easily accommodate assembly line or mass production techniques. A continuous operation of an uncomplicated procedure can be employed for this purpose. This method also accommodates techniques for containing the electrochemically active material in a cured but porous matrix in the completed electrode. A method of this type incorporates the previously separate electrode molding steps with that of assembling current collectors and containment members to simplify electrode and cell assembly.

Although the present invention has been described in terms of specific embodiments and methods, it will be clear to one skilled in the art that various modifications can be made in the materials structure and process steps within the scope of the present invention as defined in the following claims.

The embodiments of the invention in which an exclusive property or privilege is claimed are defined as follows:

1. A high-temperature, secondary electrochemical cell including a fusible salt electrolyte and solid particles of electrochemically active material in a plurality of positive and negative electrodes comprising:
   a cell housing of electrically conductive material having top and bottom walls, at least two end walls and at least two side walls defining an internal cell volume,
   said electrodes are of plate-like shape aligned in an alternating array of positive and negative electrodes along their thicknesses with major side surfaces of said electrodes in said array parallel to and facing adjacent major side surfaces of electrodes of opposite polarity;
   layers of frangible, porous electrically insulative material selected from the group consisting of ceramic powder and ceramic felt disposed between adjacent side surfaces of the positive and negative electrodes in said array;
   and said electrodes having outer side walls at their major side surfaces of rigid perforated sheets of electrically conductive material in contiguous supporting contact with said layers of frangible, porous electrically insulative material and having outer edge walls at minor edge surfaces corresponding to electrode thickness communicating with said outer side walls to define an electrode compartment for containing said particles of electrochemically active material.

2. The electrochemical cell of claim 1 wherein said electrodes each include two oppositely facing trays with rigid perforated major side surfaces and generally normally extending flanges in sideable mutual engagement for forming an expandable-contractable electrode enclosure.

3. The electrochemical cell of claim 2 wherein each of said trays include an electrical conductor bonded to the internal major surface thereof, said conductors each aligned with the corresponding conductor bonded to the oppositely facing tray, said aligned pair of conductors extending outwardly from an edge surface of said electrode to serve as an electrode terminal.

4. The electrochemical cell of claim 1 wherein said electrodes at opposite ends of the array are of same polarity.

5. The electrochemical cell of claim 1 wherein electrodes at the end of said array are of the same polarity and other electrodes of like polarity within said array are of greater thickness than the end electrodes.

6. The electrochemical cell of claim 1 wherein said end electrodes in said array each contain particulate electrochemically active material selected from the group consisting of a solid alloy containing alkali metal and a solid alloy containing alkaline earth metal, electrodes of opposite polarity to said end electrodes including particulate electrochemically active material containing a transition metal chalcogenide.

7. The electrochemical cell of claim 1 wherein said layers of frangible, porous electrically insulated material are selected from the group consisting of boron nitride, felt, yttrria felt, powdered magnesia, powdered yttria and powdered boron nitride.

8. The electrochemical cell of claim 1 wherein said perforated sheets have perforations of larger diameter than the average diameter of said solid particles of electrochemically active material.

9. The electrochemical cell of claim 1 wherein said rigid sheets contain perforations of about 150–1200 micrometers uniformly spaced over substantially all of the major surfaces thereof to provide an open area of about 30–50% in the major side surface of said electrodes.

* * * * *